US012201905B2

(12) United States Patent
Kake et al.

(10) Patent No.: US 12,201,905 B2
(45) Date of Patent: Jan. 21, 2025

(54) INFORMATION PROCESSING SYSTEM, CONTROL APPARATUS, MEDIUM, CONTROL METHOD, AND PROGRAM

(71) Applicant: SONY INTERACTIVE ENTERTAINMENT INC., Tokyo (JP)

(72) Inventors: Tomokazu Kake, Tokyo (JP); Kentarou Suzuki, Tokyo (JP); Yukari Konishi, Tokyo (JP); Tatsuaki Hashimoto, Tokyo (JP); Tsubasa Umeki, Saitama (JP); Yuki Kon, Tokyo (JP); Kazuteru Fukayama, Kanagawa (JP); Takuya Kuji, Tokyo (JP)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 586 days.

(21) Appl. No.: 17/439,448

(22) PCT Filed: Mar. 29, 2019

(86) PCT No.: PCT/JP2019/014239
§ 371 (c)(1),
(2) Date: Sep. 15, 2021

(87) PCT Pub. No.: WO2020/202336
PCT Pub. Date: Oct. 8, 2020

(65) Prior Publication Data
US 2022/0152500 A1     May 19, 2022

(51) Int. Cl.
*A63F 13/55* (2014.01)
*A63F 13/213* (2014.01)
(Continued)

(52) U.S. Cl.
CPC ............ *A63F 13/55* (2014.09); *A63F 13/213* (2014.09); *A63F 13/22* (2014.09); *A63F 13/23* (2014.09); *A63F 13/42* (2014.09)

(58) Field of Classification Search
CPC .................................. A63F 13/23; A63F 13/42
See application file for complete search history.

(56) References Cited

U.S. PATENT DOCUMENTS 4,631,845 A * 12/1986 Samuel ................. G09F 3/0288
40/6
7,198,182 B1 * 4/2007 Schulman .............. A47G 25/36
223/87

(Continued)

FOREIGN PATENT DOCUMENTS

JP     2010-131432 A     6/2010
JP     2012-239794 A     12/2012

(Continued)

OTHER PUBLICATIONS

Notice of Reasons for Refusal dated Aug. 23, 2022, from Japanese Patent Application No. 2021-511711, 3 sheets.

(Continued)

*Primary Examiner* — Corbett B Coburn
(74) *Attorney, Agent, or Firm* — XSENSUS LLP

(57) ABSTRACT

Provided is a control apparatus connected to an operating apparatus and to an information processing apparatus. The operating apparatus receives an operation performed by a user. The information processing apparatus performs information processing based on an operation performed by the user at the operating apparatus. The control apparatus receives operation-related information indicating an operation performed by the user at the operating apparatus, acquires setting information regarding an operation content receivable by the operating apparatus, processes the received operation-related information according to the acquired setting information, and outputs the processed operation-related information to the information processing apparatus.

9 Claims, 7 Drawing Sheets

(51) Int. Cl.
*A63F 13/22* (2014.01)
*A63F 13/23* (2014.01)
*A63F 13/42* (2014.01)

(56) References Cited

U.S. PATENT DOCUMENTS

| | | | | |
|---|---|---|---|---|
| 8,485,426 | B2* | 7/2013 | Cohen | G09G 3/035 235/472.01 |
| 9,460,580 | B1* | 10/2016 | Glass | B65D 73/0078 |
| 2011/0180616 | A1* | 7/2011 | Ito | G09F 3/0297 235/494 |
| 2012/0052931 | A1* | 3/2012 | Jaqua | A63F 3/00643 463/1 |
| 2012/0058819 | A1* | 3/2012 | Leake | H04L 67/131 463/29 |
| 2015/0261310 | A1* | 9/2015 | Walmsley | G06F 3/0233 345/173 |
| 2015/0290531 | A1* | 10/2015 | Herz | A63F 3/00088 434/237 |

FOREIGN PATENT DOCUMENTS

| | | |
|---|---|---|
| JP | 2012-239795 A | 12/2012 |
| JP | 2014-089578 A | 5/2014 |
| JP | 2014-090741 A | 5/2014 |
| JP | 2015-136453 A | 7/2015 |
| JP | 2016-026513 A | 2/2016 |

OTHER PUBLICATIONS

Dad Does, "Air Hogs Connect: Mission Drone Review, Augmented Reality Comes To Drones", [online], Oct. 19, 2016, YouTube,LLC, YouTube, [Aug. 9, 2022 search], and Internet <URL: https://www.youtube.com/watch?v=N4Q0jqEb_0>, 9 sheets.

International Search Report and Written Opinion mailed Jun. 18, 2019, from PCT/JP2019/014239, 10 sheets.

Kohata, Makey Makey, [online], Jun. 2, 2012, eStory Post, estorypost.com [retrieved: Jun. 5, 2019], Internet: <URL: http://estorypost.com/news/makey-makey-banana-into-touchpads/>, non-official translation ("[Video] 'Makey Makey'—The Cutting—Edge Device that Turns Bananas and Clay into Touchpads".).

* cited by examiner (a)

(b)

(a)

(b)

(c)

(d)

(e)

(f)

(a)

(b)

(a)

(b)

(c)

(d)

(e)

(f)

(g)

(h)

INFORMATION PROCESSING SYSTEM, CONTROL APPARATUS, MEDIUM, CONTROL METHOD, AND PROGRAM

TECHNICAL FIELD

The present invention relates to an information processing system, a control apparatus, a medium, a control method, and a program.

BACKGROUND ART

Information processing apparatuses for home video game consoles are known to be configured for operation such that a controller or another operating apparatus is connected to receive user operations.

SUMMARY

Technical Problem

Here, there is a demand for extending a function of a controller or another operating apparatus to be connected to information processing apparatuses. Further, in some cases, there is a demand, for example, for games played by an operating apparatus whose function can be extended by a user.

The present invention has been made in view of the above circumstances. An object of the present invention is to provide an information processing system, a control apparatus, a medium, a control method, and a program that are capable of, for example, extending the function of a controller or another operating apparatus.

Solution to Problem

In order to solve the above-mentioned conventional problem, according to an aspect of the present invention, there is provided a control apparatus. The control apparatus is to be connected to an operating apparatus and an information processing apparatus. The operating apparatus receives a user operation. The information processing apparatus performs information processing based on a user operation performed at the operating apparatus. The control apparatus includes reception means, setting acquisition means, operation-related information processing means, and output means. The reception means receives operation-related information indicating an operation performed by a user at the operating apparatus. The setting acquisition means acquires and outputs setting information regarding an operation content receivable by the operating apparatus. The operation-related information processing means processes the received operation-related information according to the acquired setting information. The output means outputs the operation-related information processed by the operation-related information processing means to the information processing apparatus. The control apparatus causes the information processing apparatus to perform information processing based on the operation-related information processed by the operation-related information processing means.

Advantageous Effect of Invention

The present invention makes it possible, for example, to extend a function of a controller or another operating apparatus.

DESCRIPTION OF EMBODIMENT

Figure 1:
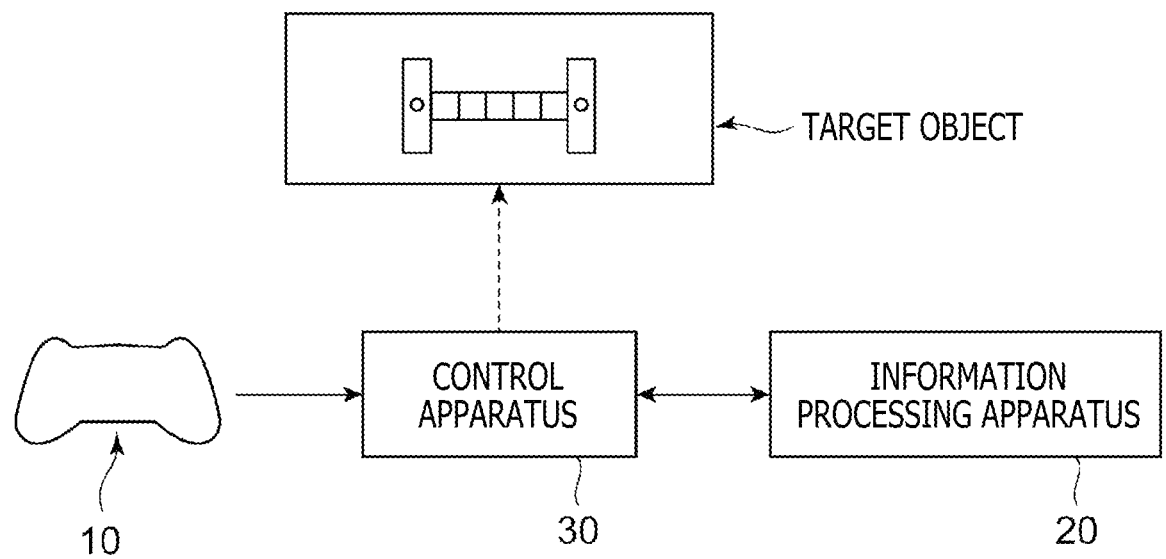
FIG. 1 is a block diagram illustrating an example configuration of an information processing system according to an embodiment of the present invention.

An embodiment of the present invention will now be described with reference to the accompanying drawings. As illustrated in FIG. 1, an information processing system 1 according to the embodiment of the present invention includes an operating apparatus 10 such as a controller, an information processing apparatus 20 such as a home video game console, and a control apparatus 30 to be connected to the information processing apparatus 20. In an example of the present embodiment, the control apparatus 30 is connected between the operating apparatus 10 and the information processing apparatus 20.

Figure 2:
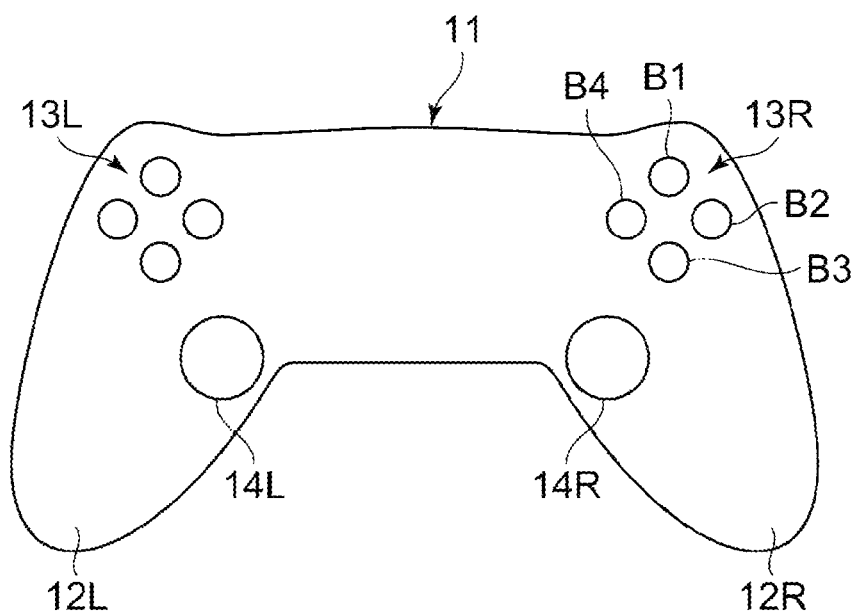
FIG. 2 is a schematic diagram illustrating an example of an operating apparatus to be connected to a control apparatus according to the embodiment of the present invention.

Here, the operating apparatus 10 is, for example, a game controller. As illustrated in FIG. 2, the operating apparatus 10 includes a main body section 11 and left and right grip sections 12L and 12R. The left and right grip sections 12L and 12R are extended in one direction respectively from the left and right ends of the main body section 11, and are to be gripped respectively by the left and right hands of a user (hereinafter collectively referred to as the "grip sections 12" when they need not be distinguished from each other). Further, disposed respectively near the left and right ends of the main body section 11 are button operating sections 13L and 13R and analog sticks 14L and 14R (hereinafter collectively referred to as the button operating sections 13 or the analog sticks 14 when they need not be distinguished from each other). The button operating sections 13L and 13R each include a plurality of buttons B. Moreover, a touchpad, a swing-type analog switch, and other buttons may be additionally disposed on the operating apparatus 10.

It should be noted that four buttons B1, B2, B3, and B4 included in the button operating section 13R are disposed on the operating apparatus 10 depicted in the example of FIG. 2 in such a manner that they can be operated by the right hand of the user.

In an example of the present embodiment, the operating apparatus 10 outputs operation-related information indicating user operations performed on the button operating sections 13 and the analog sticks 14.

Figure 3:
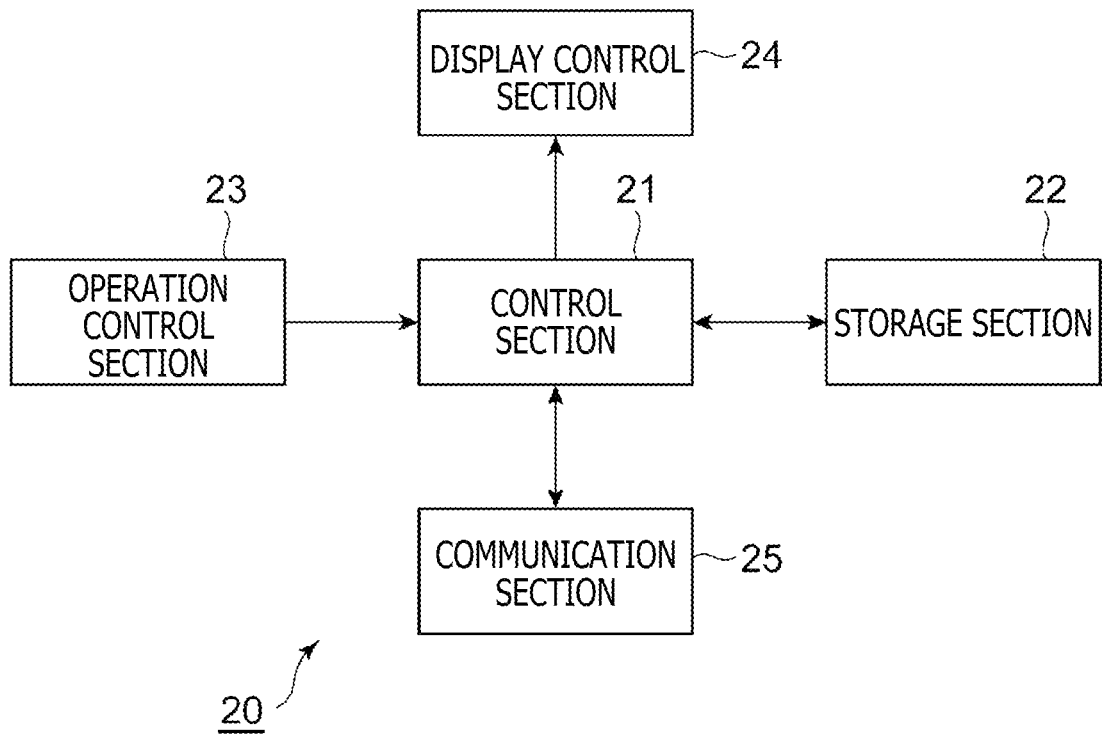
FIG. 3 is a configuration block diagram illustrating an example of an information processing apparatus according to the embodiment of the present invention.

As illustrated in FIG. 3, the information processing apparatus 20 includes a control section 21, a storage section 22, an operation control section 23, a display control section 24, and a communication section 25.

Here, the control section 21 is a central processing unit (CPU) or another program control device, and is configured to operate according to a program stored in the storage section 22 and perform various information processes. In the present embodiment, the control section 21 receives, through the control apparatus 30, processed operation-related information that is obtained by processing the operation-related information indicative of a user operation performed on the operating apparatus 10, and executes a predetermined information process (e.g., a process of controlling a character in a game). A detailed example of operation of the control section 21 will be described later.

The storage section 22 is, for example, a disk device or a memory device, and is configured to retain a program to be executed by the control section 21. Further, the storage section 22 also functions as a work memory of the control section 21.

The operation control section 23 receives setting information inputted from the control apparatus 30, and outputs the received setting information to the control section 21. The display control section 24 causes a home television set or another display apparatus to display information according to an instruction inputted from the control section 21.

The communication section 25 is, for example, a network interface, and is configured to transmit information, for example, to an external apparatus through a network according to an instruction inputted from the control section 21. Further, the communication section 25 outputs received information to the control section 21 through the network.

Figure 4:
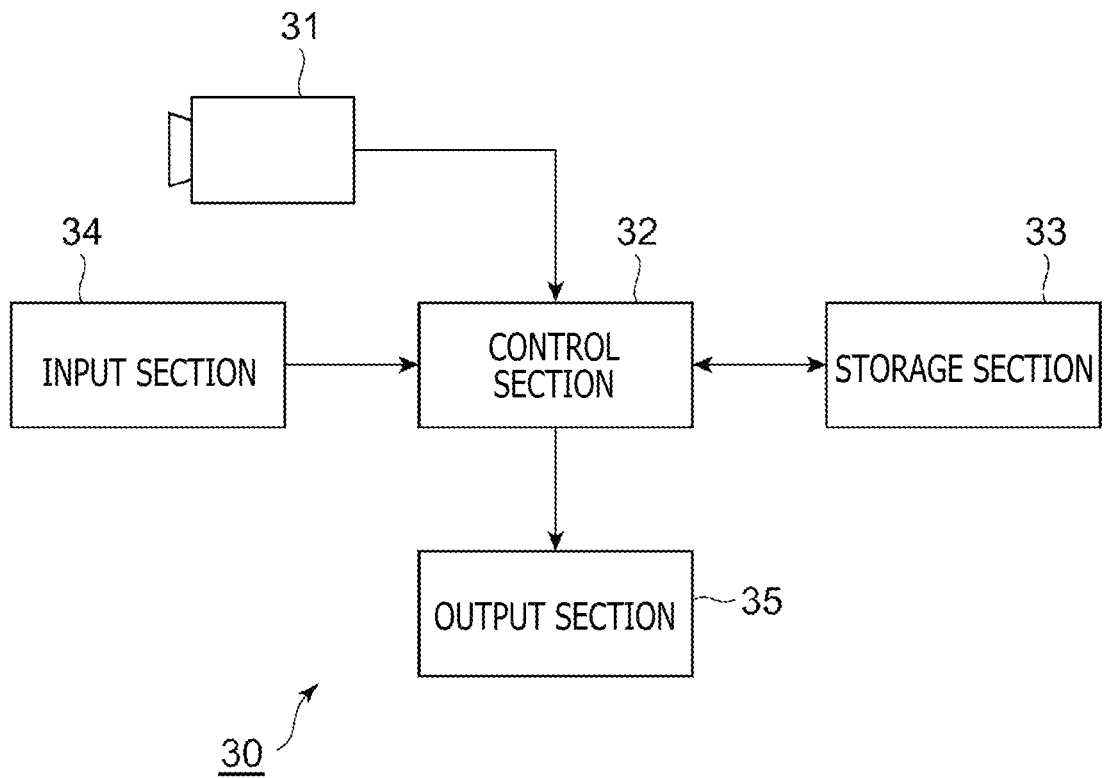
FIG. 4 is a configuration block diagram illustrating an example of the control apparatus according to the embodiment of the present invention.

As illustrated in FIG. 4, the control apparatus 30 includes an imaging section 31, a control section 32, a storage section 33, an input section 34, and an output section 35. Here, the imaging section 31 is a camera, and is used to capture an image of a predetermined target object on which the user performs an operation. The target object will be described in detail later.

The control section 32 is a CPU or another program control device, and is configured to operate according to a program stored in the storage section 33. In an example of the present embodiment, the control section 32 receives operation-related information indicative of a user operation performed at the operating apparatus 10, and acquires setting information regarding an operation content receivable by the operating apparatus 10. Subsequently, the control section 32 processes the received operation-related information according to the acquired setting information, outputs the processed operation-related information to the information processing apparatus 20, and causes the information processing apparatus 20 to perform information processing based on the processed operation-related information. The operations of the control section 32 will be described in detail later.

The storage section 33 is, for example, a disk device or a memory device, and is configured to retain a program to be executed by the control section 32. Further, the storage section 33 also functions as a work memory of the control section 32.

The input section 34 is wiredly or wirelessly connected to the operating apparatus 10, and is configured to receive operation-related information outputted from the operating apparatus 10 and output the received operation-related information to the control section 32. The output section 35 is wiredly or wirelessly connected to the information processing apparatus 20, and is configured to receive processed operation-related information outputted from the control section 32 and output the received processed operation-related information to the information processing apparatus 20.

Figure 5:
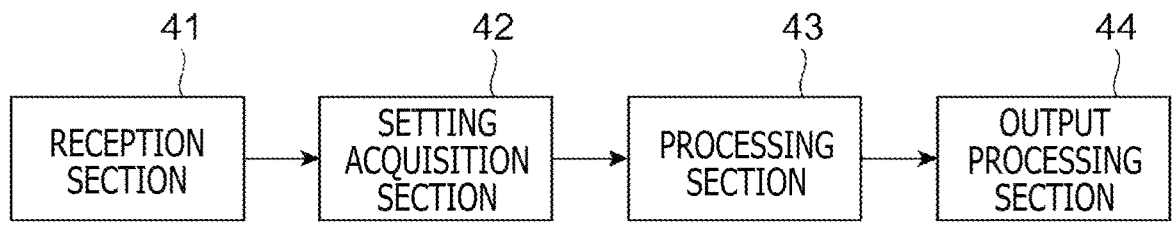
FIG. 5 is a functional block diagram illustrating an example of the control apparatus according to the embodiment of the present invention.

Here, first of all, the operations of the control section 32 in the control apparatus 30 will now be described. In an example of the present embodiment, as illustrated in FIG. 5, the control section 32 functionally includes a reception section 41, a setting acquisition section 42, a processing section 43, and an output processing section 44.

Figure 6:
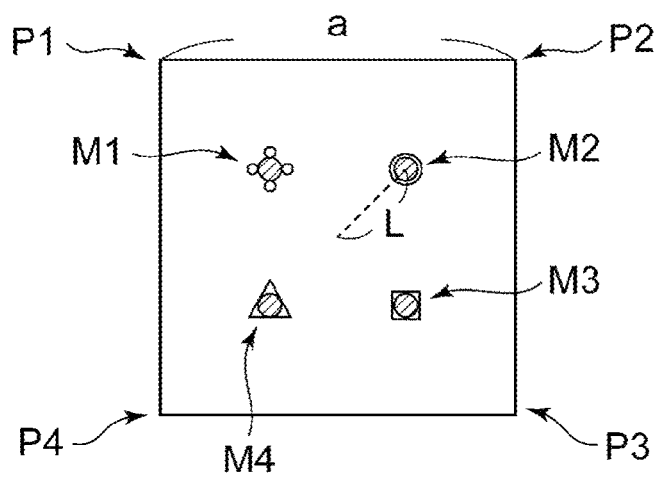
FIG. 6 depicts diagrams illustrating examples of origami used by the control apparatus according to the embodiment of the present invention.
Figure 6:
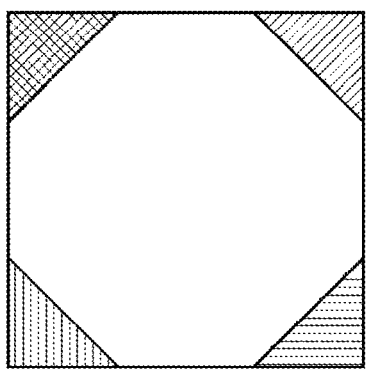

Further, in an example of the present embodiment, the target object to be imaged by the imaging section 31 of the control apparatus 30 is a foldable, sheet-shaped medium (more specifically, origami or another print medium), and is, for example, origami having a rectangular or another polygonal outline, as illustrated in (a) of FIG. 6. Disposed on a front surface (one surface) of the target object are computer-recognizable patterns (hereinafter referred to as the markers) corresponding to operation targets included in the operating apparatus 10. Even when the markers are disposed, for example, in rectangles, circles, or other figures, they need not always be visually distinguishable by the human eye due to mixture with a patterned background and may be in any mode as far as they are computer-identifiable. More specifically, the markers may be computer-readable coded images, circular, X-shaped, or other figures, or figures colored in predetermined colors corresponding to the operation targets.

Furthermore, a portion other than the markers may have no pattern at all. Some other patterns that are computer-distinguishable from the markers (hereinafter referred to as the background patterns when they need be distinguished from each other) may be additionally disposed. Moreover, it is assumed here that the operation targets are, for example, the buttons B1, B2, B3, and B4. Additionally, there is no need to dispose the markers on the back surface of the origami.

In addition, the examples of FIG. 6 assume that the origami used as the target object is square in shape, and that the center of the target object is the same as that of a peripheral square, and further that markers M1, M2, M3, and M4 corresponding to the buttons B1, B2, B3, and B4, respectively, are disposed at individual vertices of a square smaller than the whole origami. However, the above-described marker arrangement is merely an example, and various other marker arrangements may be adopted.

Further, it is assumed in the example of the present embodiment that, as illustrated in (b) of FIG. 6, a portion of the front surface of the origami that has no markers (a surface having markers when the markers are disposed on only one surface or either one of the surfaces when the markers are disposed on both surfaces) has a background pattern that is without patterns and colored in a predetermined background color (hereinafter referred to as the front surface background color).

Furthermore, it is assumed that the other surface (the back surface, that is, a surface different from the front surface) of the origami has a background pattern that is colored in a color different from the front surface background color (hereinafter referred to as the back surface background color), and that triangles T1, T2, T3, and T4 near the vertices of the back surface of the origami are colored in different colors (and colored in colors different from those of the surface and back surface). Moreover, the lengths of sides of the triangles that overlap with the sides of the origami are assumed to be shorter than half the length of one side of the origami.

For example, when the front surface background color is white while the back surface background color is gray, the above-mentioned four triangles may be colored in red, blue, green, and black, respectively. In FIG. 6, for convenience of illustration, the individual colors are indicated as the substitutes for patterns.

The user folds the origami in order to input the setting information to the control apparatus 30. More specifically, the user is allowed to fold the origami in such a manner that one vertex of the origami reaches any one of the markers ((a) of FIG. 7). Additionally, the user is allowed to fold the origami in such a manner that one vertex of the origami reaches a marker other than the marker positioned closest to the vertex ((b) and (c) of FIG. 7). In such a case, some of the markers may be hidden by the folded origami.

Figure 7:
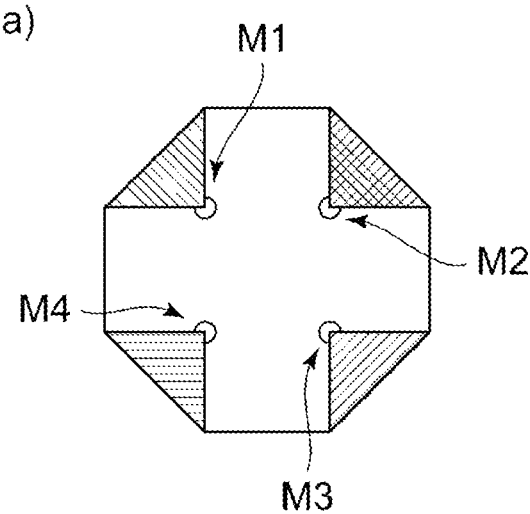
FIG. 7 depicts diagrams illustrating usage examples of origami used by the control apparatus according to the embodiment of the present invention.
Figure 7:
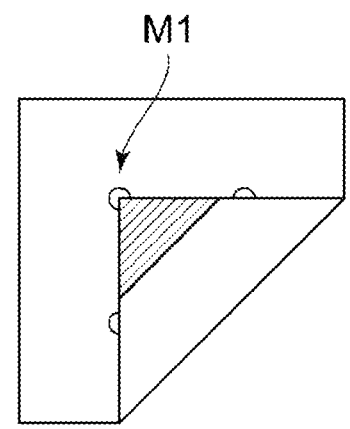
Figure 7:
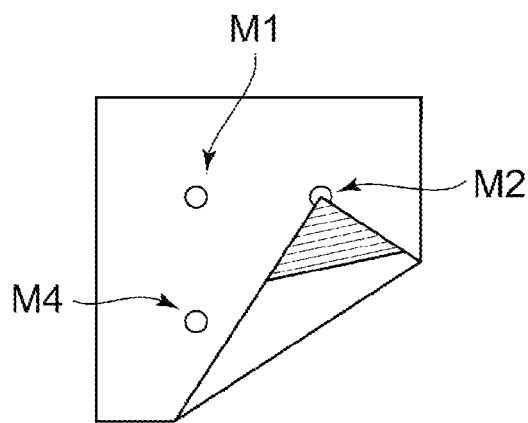
Figure 7:
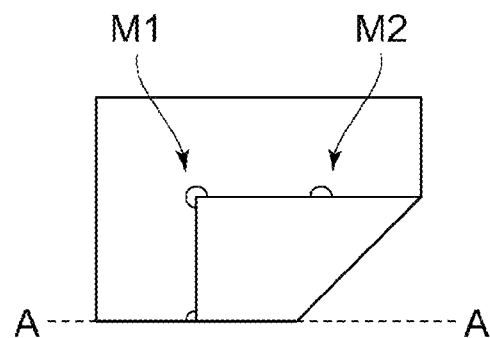
Figure 7:
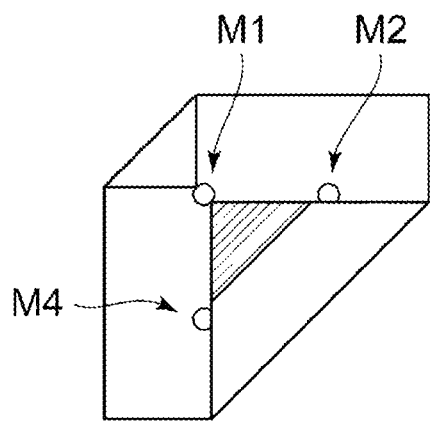
Figure 7:
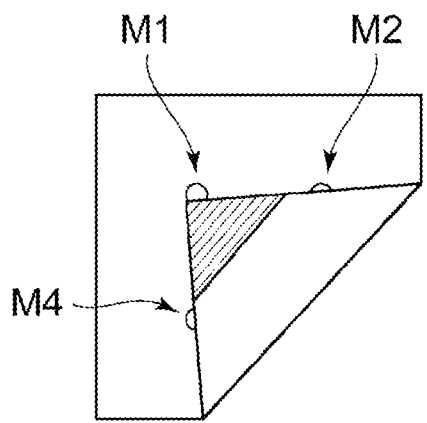

Further, the user may fold the origami irrespective of the markers ((d) of FIG. 7). Furthermore, even in a case where the origami is to be folded to let its vertex reach any one marker, the origami need not always be folded to position its vertex at the center of the marker. Stated differently, folding may be performed in such a manner that the vertex comes into touch with an outer edge of the marker ((e) of FIG. 7). Alternatively, folding may be performed in such a manner that the vertex is positioned away from the center of the marker (figures appearing on the back surface of folded origami are asymmetric) ((f) of FIG. 7). As described above, it is conceivable that the origami may be folded in various ways.

When the control section 32 of the control apparatus 30 functions as the reception section 41, the reception section 41 receives and retains the operation-related information outputted from the operating apparatus 10.

The setting acquisition section 42 receives an input of image data of a target object imaged by the imaging section 31, and operates in a manner described in the following example. The setting acquisition section 42 detects, from the origami that is folded by the user and imaged and represented by the received image data, the positions of the markers and the color and position of a vertex positioned at a predetermined distance from the center of the origami (positioned at the predetermined distance from the center after folding). The above-mentioned color of the vertex is the color of the back surface near the vertex appearing upon folding (hereinafter referred to as the vertex identification color). The above-mentioned predetermined distance L should be predetermined such that L<a when the width (or height) of the origami is a.

Further, it is not always necessary to detect all the markers. Furthermore, a contour detection method may be used to detect the position of a vertex of the origami. As mentioned earlier, the individual vertices of the back surface of the origami (the surface appearing upon folding) are colored in different colors. Therefore, performing contour detection and color detection makes it possible to detect which vertex is in touch with which marker (i.e., detect the individual vertices closest to the individual markers on an individual vertex basis).

The setting acquisition section 42 acquires information regarding the central position of each of the markers M1, M2, M3, and M4 that should be disposed on the origami (information regarding the position of the center of a circle circumscribing a marker), acquires information regarding the vertex identification color and position of a vertex closest to the central position, and records the acquired information in association with marker identification information.

In a case where the recorded information includes vertices identified by the same vertex identification color, the setting acquisition section 42 deletes information regarding the associated vertex identification color and the corresponding vertex position from information regarding markers associated with the common vertex identification color except for markers whose distance between their central positions and vertex positions is minimized.

Subsequently, when the central position, vertex identification color, and corresponding vertex position of a marker are associated with each other on an individual marker basis, the setting acquisition section 42 outputs, as the setting information, information indicating the distance between the central position and vertex position of the marker. It should be noted that the above information is an example of the setting information. Different types of the setting information will be described later.

For example, in a case where the origami is folded as depicted in (a) of FIG. 7, a vertex P1 is the closest to the marker M1. Therefore, the color (C1) of the vicinity of the vertex P1 on the back surface of the origami is regarded as the vertex identification color, and information identifying the marker M1, its central position R1, the vertex identification color C1 of the nearest vertex P1, and information identifying the position of the vertex P1 are recorded in association with each other. This situation is hereinafter expressed as follows.

M1,R1:C1,P1

The following expressions are also true for the markers M2, M3, and M4.

M2,R2:C2,P2
M3,R3:C3,P3
M4,R4:C4,P4

The above indicates that the record does not include vertices identified by the same vertex identification color. Therefore, the setting acquisition section 42 outputs the setting information by outputting a distance r1 between the central position R1 and the vertex P1 as for the marker M1, outputting a distance r2 between the central position R2 and the vertex P2 as for the marker M2, and so on.

Meanwhile, in a case where the origami folded as depicted in (b) of FIG. 7 is imaged, the vertex P3 is the closest to the marker M1, and the vertex closest to the markers M2, M4 is also the vertex P3. Further, the marker M3 is hidden. Therefore, the setting acquisition section 42 records the following information.

M1,R1:C3,P3
M2,R2:C3,P3
M4,R4:C3,P3

The above indicates that the individual markers are associated with the common vertex identification color. Therefore, the setting acquisition section 42 determines the distance between the central position and vertex position of each marker, and deletes information regarding the associated vertex identification color and the corresponding vertex position from information regarding markers except for the marker having the minimum distance (the marker M1 in the above instance).

Stated differently, the setting acquisition section 42 corrects the record as indicated below.

M1,R1:C3,P3
M2,R2:
M4,R4

Subsequently, as regards a marker with which the vertex identification color and the corresponding vertex position are associated (only the marker M1 in this instance), the setting acquisition section 42 outputs, as the setting information, information indicating the distance between the central position and vertex position of the marker, that is, a distance r13 between the central position R1 and position of vertex P3 of the marker M1.

Based on the setting information outputted from the setting acquisition section 42, the processing section 43 processes the operation-related information received by the reception section 41. More specifically, the processing section 43 processes the operation-related information in accordance with rules pre-established based on conditions related to the setting information. Here, the conditions related to the setting information include, for example, the following.

Presence of the setting information regarding a marker corresponding to an operation content includible in the operation-related information (e.g., the type of a depressed button)

A distance between a marker corresponding to an operation content includible in the operation-related information and an origami vertex closest to the marker Further, the rules established based on the above conditions include, for example, the following.

When there is the setting information regarding a marker corresponding to an operation content includible in the operation-related information (e.g., the type of a depressed button), the operation-related information regarding the operation content is to be outputted on an as-is basis.

When there is no setting information regarding a marker corresponding to an operation content includible in the operation-related information, the operation-related information regarding the operation content is not to be outputted (is to be blocked).

When there is the setting information regarding a marker corresponding to an operation includible in the operation-related information, and the setting information includes information regarding a distance to the nearest origami vertex, the operation-related information regarding the operation in which the information regarding the distance is included is to be outputted.

The output processing section 44 outputs, to the information processing apparatus 20, processed operation-related information outputted from the processing section 43.

Example of Operation

The present embodiment is configured as described in the above example. According to the above example, an operation described below is performed.

In the following description of the present embodiment, it is assumed that the origami illustrated in FIG. 6 is prepared by the user. As illustrated in (a) of FIG. 6, the markers corresponding to the operation targets (some of the operation targets) included in the operating apparatus 10 are disposed on the front surface of the prepared origami. In the following example, it is assumed that the markers M1, M2, M3, and M4 corresponding to the buttons B1, B2, B3, and B4, respectively, are disposed at rectangular vertices centered around the center of the origami.

Further, as illustrated in (b) of FIG. 6, it is assumed that three triangular areas near the individual vertices of the back surface of the origami are colored in different colors (and colored in colors different from those of the front and back surface background colors).

The user folds the origami in consideration, for example, of processing performed in the control apparatus 30. In the present example, it is assumed that the following processing is performed as described earlier.

When there is the setting information regarding a marker corresponding to an operation content includible in the operation-related information (e.g., the type of a depressed button), processing is performed to output the operation-related information regarding the operation content on an as-is basis.

When there is no setting information regarding a marker corresponding to an operation content includible in the operation-related information, processing is not performed to output the operation-related information regarding the operation content (processing is performed to block the operation-related information regarding the operation).

It is also assumed that a game application executed in the information processing apparatus 20 is as described below.

Specifically, it is assumed that the information processing apparatus 20 executes a battle game, performs a process of attacking an opponent with a currently selected weapon when the button B1 is depressed, and performs a process of changing the weapon when the button B2 is depressed.

When, for example, there is a concern about the possibility of the user depressing the button B2 inadvertently during the play of the above-described game in a situation where the user intends to use only an initially selected weapon without switching to another weapon, the user folds the origami so as to position a vertex on the button B1 to be used (position the vertex at the center of a circle circumscribing the button B1), and position no vertex near the button B2 (the button to be prevented from being inadvertently depressed), which is not to be used (e.g., the user folds the origami as depicted in (b) of FIG. 7).

Subsequently, the user causes the control apparatus 30 to image the origami folded as described above. The control apparatus 30 then detects, from image data of the origami, which is an imaged target object, the positions of the markers on the imaged origami and the color and position of a vertex placed at a predetermined distance from the center of the origami (placed at the predetermined distance from the center after folding), and records the result of detection. The detected color of the vertex is the color of the back surface near the vertex appearing when the origami is folded and is hereinafter referred to as the vertex identification color. Then, if some markers are associated with the common vertex identification color, the control apparatus 30 deletes, from the record, information regarding the associated vertex identification color and the corresponding vertex position except for a marker that is associated with the common vertex identification color and has the minimum distance between the marker's central position and vertex position.

As already described, in a case where the origami folded as depicted in (b) of FIG. 7 is imaged, the above-mentioned record is expressed as follows in a format of "marker identification information, marker position information: vertex identification color of associated vertex, and vertex position information."

M1,R1:C3,P3
M2,R2:
M4,R4

Subsequently, as regards a marker associated with the vertex identification color and the corresponding vertex position (only the marker M1 in the present example), the control apparatus 30 outputs, as the setting information, information indicating the distance between the central position and vertex position of the marker, that is, the distance r13 between the central position R1 and position of vertex P3 of the marker M1.

When the user subsequently operates the operating apparatus 10 and depresses the button B1, the control apparatus 30 receives the operation-related information indicating that the button B1 is depressed. The control apparatus 30 then references the received operation-related information to determine whether or not there is the setting information regarding the marker M1 corresponding to the operated button B1.

In the present example, there is the above setting information. Therefore, the control apparatus 30 outputs the received operation-related information to the information processing apparatus 20 on an as-is basis.

As is the case where the control apparatus 30 is unavailable, the information processing apparatus 20 receives the operation-related information indicating that the button B1 is depressed, concludes that the button B1 is depressed, and performs game processing. That is, the information processing apparatus 20 performs processing on the assumption that the opponent is attacked with a currently selected weapon.

Meanwhile, when the user operates the operating apparatus 10 and depresses the button B2, the control apparatus 30 receives the operation-related information indicating that the button B2 is depressed. The control apparatus 30 then references the received operation-related information to determine whether or not there is the setting information regarding the marker M2 corresponding to the operated button B2.

In the present example, it is assumed that there is no such setting information. Therefore, the control apparatus 30 discards the received operation-related information without outputting it to the information processing apparatus 20.

Consequently, the information processing apparatus 20 does not receive the information indicating that the button B2 is depressed. As a result, the information processing apparatus 20 does not perform a process related to a weapon change although the button B2 is operated by the user.

Alternative Examples of Setting Information, Processing, and Other Operations in Control Apparatus Further, the foregoing examples are merely illustrative of the present embodiment and not restrictive thereof. The origami imaged by the control apparatus 30 in the present embodiment is not limited to the one illustrated in FIG. 6 but may be configured such that markers are disposed on the front surface (as is the case with the example in (a) of FIG. 6) while computer-readable coded images are arranged in a matrix on the back surface and on a portion of the front surface that has no markers. Further, the coded images may be embedded, for example, in patterns (so that the coded images are hardly recognizable by the human eye). Technologies for such coded image formation and embedding are widely known and will not be described in detail here.

Furthermore, the processing performed by the control apparatus 30 (and the processing performed accordingly by the information processing apparatus 20) may be as described below.

For example, the setting acquisition section 42 of the control apparatus 30 may identify folded portions from a captured image of the origami. The folded portions can be recognized by detecting the color used on the back surface depicted, for instance, in the example of FIG. 6. Moreover, a widely known method may be adopted to perform a process of recognizing the folded portions from an image in a case where the coded images are arranged in a matrix.

In the above example, for each folded portion, the setting acquisition section 42 causes the setting information to include information identifying a marker whose central position is the closest to an origami vertex included in a folded portion. Further, in this instance, the setting acquisition section 42 may cause the setting information to include information indicating the area of the folded portion.

Furthermore, in the above example, the setting acquisition section 42 may use captured image data to estimate the area of the origami in a situation where it is not folded, and output information regarding the estimated area as part of the setting information. This estimation may be made, for example, by determining the area of a square circumscribing a captured origami image (a correct value will be obtained unless a vertex is positioned outside the sides of the origami after folding). In a case where the coded images are used, the overall size of the origami may be estimated based on the size of captured coded images. Moreover, the user may capture an image of origami still not folded, and then input information regarding the area of the origami.

In a case where information identifying a marker whose central position is the closest to an origami vertex included in a folded portion and information regarding the area of the folded portion are acquired as the setting information regarding each portion folded as described above, the processing section 43 (and the output processing section 44) may output information regarding the area of the folded portion (hereinafter referred to as the area information), which includes information regarding the distance between an origami vertex closest to a marker corresponding to an operation content included in the operation-related information and the central position of the corresponding marker and information regarding the origami vertex, to the information processing apparatus 20 together with information regarding an operation content.

In the above example, even if a button depressed by the user indicates an on/off state, the information processing apparatus 20 receives not only the operation-related information indicating the depressed button, but also the area information inputted in relation to the operation-related information. This makes it possible to change, for example, game processing parameters according to the received area information. The following processing performed in a case, for example, where a parameter representing attack power is to be changed.

Specifically, it is assumed in the following example that attack processes of using different attack methods are assigned to the buttons B1, B2, B3, and B4, respectively. In this case, if, as illustrated in (a) of FIG. 7, the user folds the origami vertices respectively toward the markers M1 to M4, which are disposed on the front surface of the origami (the folded portions have the same area in this case), the control apparatus 30, which captures an image of the origami folded in the above manner, receives the operation-related information indicating that any one of the buttons B1 to B4 is depressed. In this instance, the received operation-related information includes the area information regarding the area of a folded portion related to a marker corresponding to the depressed button. However, the value indicated by the area information outputted in the above case remains the same no matter what button is depressed. Therefore, even if a parameter representing the attack power of any attack method is changed based on the area information, the information processing apparatus 20 performs processing on the assumption that the different attack methods use the same attack power.

Meanwhile, in a case where the user folds the origami in a manner illustrated, for example, in (b) of FIG. 7, the control apparatus 30, which captures an image of the origami folded in the above manner, receives the operation-related information. In this instance, however, the area information varies depending on whether or not the operation-related information is received when the button B1 is pressed or received when one of the other buttons (buttons B2 to B4) is pressed. More specifically, the area information outputted to the information processing apparatus 20 when the button B1 is depressed indicates a greater value than the area information outputted when one of the other buttons is depressed.

Consequently, the information processing apparatus 20 performs setup such that the attack power provided by the button B1 is higher than the attack power provided by the other buttons (an alternative is to determine the total attack power and perform setup based on the ratio of area information between the individual buttons. In this case, the control apparatus 30 may output the area information indicating the ratio of area between folded portions related to the corresponding markers with respect to the total area of the folded portions).

In the above example, the user is allowed to set the attack power provided by each attack method depending on how the origami is folded. This enables the user, for example, to play a game by extending the function of the operating apparatus 10, which acts as a controller.

Additionally, as illustrated in (d) of FIG. 7, the area of a folded portion may be changed or adjusted by mountain-folding the origami along line A-A. In this manner, the user may be allowed to set the attack power as desired.

In the above instance, the information processing apparatus 20 may further reference information regarding the distance between the position of a folded vertex and the central position of a marker corresponding to the depressed button, which is included in the information received from the control apparatus 30 when one of the buttons B1 to B4 is depressed, and set the delay time (latency) before the start of an attack and the accuracy of attack (the probability of successful attack).

In the above example, the accuracy of attack varies with the accuracy of position of paper folding (varies with the closeness of a folded vertex to the central portion of a marker). This will provide increased playfulness.

Further, the function may vary with the way of folding. For example, the operation-related information provided by an analog switch may be changed depending on how an origami vertex is in touch with a marker corresponding to the analog switch and in order, for example, to output original analog values (gradual values) or output discrete values such as "0" and "255." It is assumed in this case that the analog switch varies its output value gradually, for example, in 256 steps between "0" and "255" according to the amount of analog switch depression, and outputs information identifying the depressed switch as well as the output value as the operation-related information.

For example, the control apparatus 30 may recognize whether or not the origami vertex is in a circle circumscribing the marker, as depicted, for instance, in (a) of FIG. 7, and has reached a spot that is positioned away from the center of the circumscribing circle by a distance determined by multiplying the radius of the circumscribing circle by a predetermined coefficient smaller than 1, or the origami vertex is in touch with the circle circumscribing the marker as illustrated in (e) of FIG. 7 (the position of the origami vertex is within a predetermined range from the center of the circumscribing circle including the radius of the circumscribing circle), then determine, based on the result of recognition, whether to output the operation-related information on an as-is basis or to discretize the operation-related information into "0" or "255" according to a predetermined threshold value and output the discretized information, and perform a process based on the result of determination.

In the above example, when the origami is folded as depicted, for instance, in (e) of FIG. 7, the control apparatus 30 discretizes the output of the analog switch, and outputs the result of discretization to the information processing apparatus 20.

Alternative Examples of User Operations and Examples of Corresponding Processing Further, the foregoing description assumes that the user uses the origami to control the processing that the control apparatus 30 performs on the operation-related information outputted from the operating apparatus 10. However, the present embodiment is not limited to such user operations.

Figure 8:
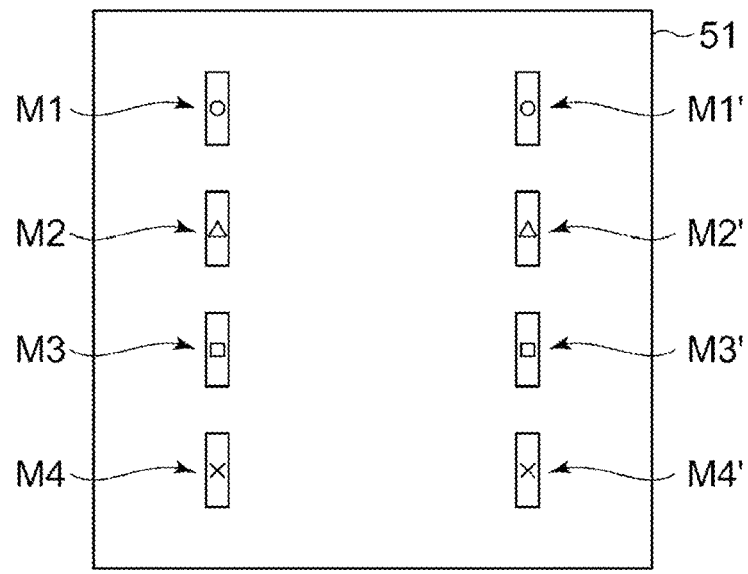
FIG. 8 is a diagram illustrating an example of a board used by the control apparatus according to the embodiment of the present invention.

For example, the user may use the following target object instead of the origami. The target object according to an alternative example of the present embodiment includes a board 51 illustrated in FIG. 8. A plurality of markers are disposed on the board 51. As is the case with the origami, these markers are, for example, computer-identifiable patterns or surface irregularities for identifying the markers from their images. More specifically, the board 51 illustrated in FIG. 8 is configured such that a pair of input and output markers M1 and M1', a pair of input and output markers M2 and M2', a pair of input and output markers M3 and M3', and a pair of input and output markers M4 and M4', are disposed for the buttons B1, B2, B3, and B4, respectively. Here, the markers M1, M2, M3, and M4 are the input markers, and the markers M1', M2', M3', and M4' are the output markers.

In the example of FIG. 8, the pairs of markers corresponding to common buttons are disposed on non-intersecting straight lines. That is, a line segment joining the markers M1 and M1' and a line segment joining the markers M2 and M2' do not intersect with each other (are parallel to each other).

The user disposes a coupling material (corresponding to a coupling element) such as a detachable block (e.g., building block) or a plastic material between the markers in order to establish a connection between the input markers and the output markers (hereinafter simply referred to as an inter-marker connection). For example, clay may be used as the coupling material.

In a case where clay is used as the coupling material, the control apparatus 30 captures an image of the board 51 and coupling material disposed on the board 51 by the user, recognizes a plurality of markers that are coupled to each other with the clay, and acquires, as the setting information, information identifying a group of markers coupled to each other. It should be noted that various image recognition processes (e.g., a generally-called robot vision process) may be performed as a process of recognizing, based on image data, whether or not the markers are coupled with the clay. For example, when the surface of the board 51 is colored differently from the clay in order to determine whether or not a pair of markers are positioned within a clay color range, it is possible to determine whether or not the pair of markers are coupled with the clay.

Figure 9:
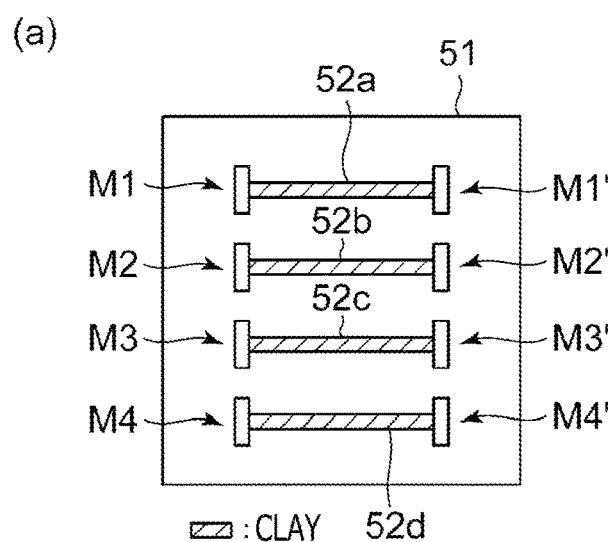
FIG. 9 depicts diagrams illustrating examples of connections between markers on the board used by the control apparatus according to the embodiment of the present invention.
Figure 9:
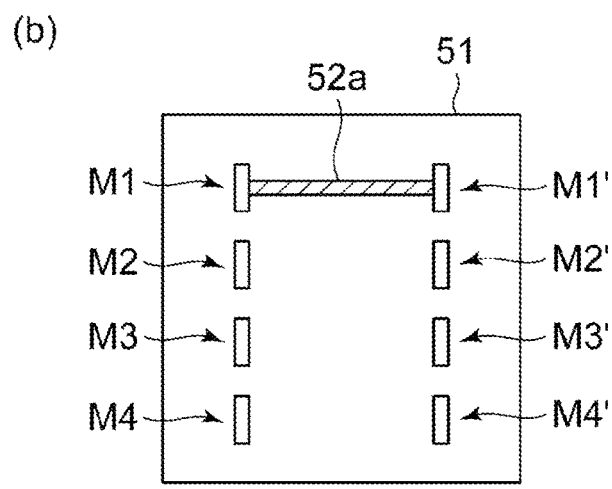

For example, in a case where, as illustrated in (a) of FIG. 9, the markers M1 and M1' are coupled to each other with clay 52a, the markers M2 and M2' are coupled to each other with clay 52b, the markers M3 and M3' are coupled to each other with clay 52c, and the markers M4 and M4' are coupled to each other with clay 52d, the control apparatus 30 regards, as the setting information, information identifying the following four pairs of markers:

Group 1: markers M1 and M1'
Group 2: markers M2 and M2'
Group 3: markers M3 and M3'
Group 4: markers M4 and M4'

Meanwhile, in a case where, as illustrated in (b) of FIG. 9, the markers M1 and M1' are coupled to each other with the clay 52a and the other markers M2 to M4' are not coupled to each other with clay, the control apparatus 30 regards, as the setting information, information identifying the following one pair of markers.

Group 1: markers M1 and M1'

Based on the acquired setting information, the control apparatus 30 processes the operation-related information received from the operating apparatus 10. In this example, too, the control apparatus 30 processes the operation-related information in accordance with rules pre-established based on conditions related to the setting information, as is the case where the origami is used. Here, the conditions related to the setting information include, for example, the following.

Whether or not a pair of markers corresponding to an operation content includible in the operation-related information (e.g., the type of a depressed button) are coupled to each other.

Information indicating the mode of coupling between a pair of markers corresponding to an operation content includible in the operation-related information (the mode of formation of coupling elements).

Here, the information indicating the mode of coupling, that is, the information regarding the mode of formation of coupling elements is, for example, information regarding the amount of clay used for coupling, or more specifically, information regarding the width of clay used to couple a pair of markers to each other.

Further, the rules established based on the above conditions include, for example, the following.

When a pair of markers corresponding to an operation content includible in the operation-related information (e.g., the type of a depressed button) are coupled to each other (there is corresponding setting information), the operation-related information regarding the operation content is to be outputted on an as-is basis.

When a pair of markers corresponding to an operation content includible in the operation-related information are not coupled to each other (there is no corresponding setting information), the operation-related information regarding the operation content is not to be outputted (is to be blocked).

When a pair of markers corresponding to an operation content includible in the operation-related information are coupled to each other, information indicating the mode of coupling between the pair of markers (the mode of formation of coupling elements) is to be included in the operation-related information and outputted.

In the above example, the user performs setup by using clay to couple a plurality of markers on the board 51 illustrated, for instance, in FIG. 8.

For example, in a case where the information processing apparatus 20 executes a battle game, performs a process of attacking an opponent with a currently selected weapon when the button B1 is depressed, and performs a process of changing the weapon when the button B2 is depressed, the control apparatus 30 captures an image of the board 51 as far as clay is used for coupling as depicted in (b) of FIG. 9, and regards, as the setting information, information identifying a group of markers coupled to each other. More specifically, in the example depicted in (b) of FIG. 9, information identifying the following one pair of markers is regarded as the setting information as described already.

Group 1: markers M1 and M1'

If, in the above case, the user operates the operating apparatus 10 and depresses the button B1, the control apparatus 30 receives the operation-related information indicating that the button B1 is depressed, and references the received operation-related information to determine whether or not there is the setting information regarding a group including the marker M1 corresponding to the operated button B1.

In the present example, there is the above setting information. Therefore, the control apparatus 30 references the setting information, and concludes, based on the received operation-related information (the information indicating that the button B1 is depressed), that the marker M1 corresponding to the button B1 is coupled to the marker M1' (another marker included in the same group) and that the marker M1' corresponds to the button B1, and outputs, to the information processing apparatus 20, the operation-related information indicating that the button B1 is depressed.

The information processing apparatus 20 receives the operation-related information indicating that the button B1 is depressed, and performs game processing on the assumption that the button B1 is depressed. That is, the information processing apparatus 20 performs a process on the assumption that a currently selected weapon is used to attack an opponent.

Meanwhile, when the user operates the operating apparatus 10 and depresses the button B2, the control apparatus 30 receives the operation-related information indicating that the button B2 is depressed. However, there is no existing setting information regarding the marker M2 corresponding to the button B2, which is an operation target indicated by the operation-related information. Therefore, the control apparatus 30 discards the received operation-related information without outputting it to the information processing apparatus 20.

Consequently, the information processing apparatus 20 does not receive the information indicating that the button B2 is depressed. As a result, the information processing apparatus 20 does not perform a process related to a weapon change although the button B2 is operated by the user.

It should be noted that, if, in the above example, the user uses clay to couple the markers M1 and M2' on the board 51, the control apparatus 30 regards, as the setting information, information identifying the following one pair of markers.

Group 1: markers M1 and M2'

If, in the above case, the user depresses the button B1, the control apparatus 30, upon receiving the operation-related information indicating that the button B1 is depressed, references, based on the setting information regarding a group including the marker M1 corresponding to the button B1, the marker M2', which belongs to the same group as the marker M1. As the marker M2' is a marker corresponding to the button B2, the control apparatus 30 outputs, to the information processing apparatus 20, the operation-related information indicating that the button B2 is depressed.

As described above, according to the above example of the present embodiment, for example, the exchange of operating buttons can be set by changing the mode of coupling with clay.

Further, in the above example of the present embodiment, the setting information based on the mode of formation (the shape expressed by clay or block arrangement) of coupling elements, which couple the markers to each other, for example, with clay or blocks, may be outputted so as to process, based on the outputted setting information, the operation-related information received from the operating apparatus 10.

The control apparatus 30 may recognize, as information indicating the mode of formation of a coupling element, for example, a change in the path length or width of the coupling element (in a case where the width varies along a coupling path) and the presence of a hole, and process the operation-related information according to the result of recognition.

Figure 10:
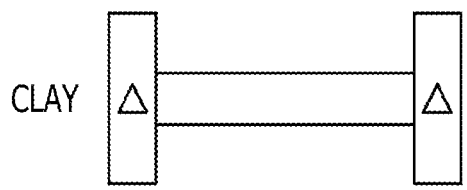
FIG. 10 depicts diagrams illustrating the modes of connection between the markers on the board used by the control apparatus according to the embodiment of the present invention.
Figure 10:
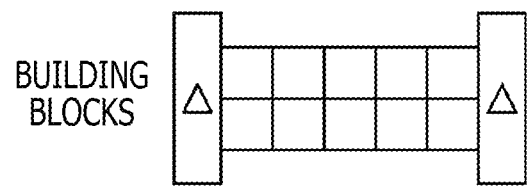
Figure 10:
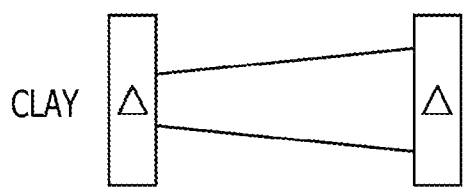
Figure 10:
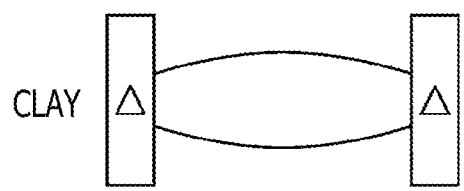
Figure 10:
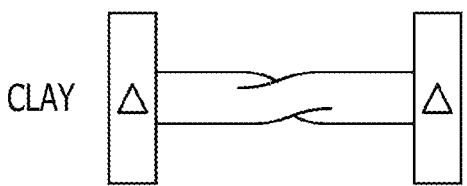
Figure 10:
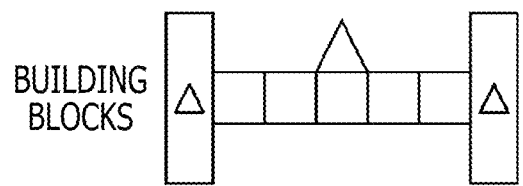
Figure 10:
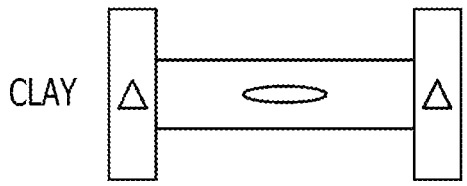
Figure 10:
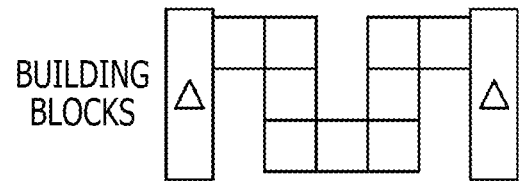

Concrete examples are depicted in (a) to (h) of FIG. 10. These examples assume that a pair of markers coupled by the coupling element correspond to an analog switch in the operating apparatus 10 (the analog switch varies its output value gradually, for example, in 256 steps between "0" and "255" according to the amount of analog switch depression, and outputs information identifying the depressed switch as well as the output value as the operation-related information). In this instance, the control apparatus 30 receives an input of information regarding the output value as the operation-related information regarding an operating element (analog switch) corresponding to the markers, and processes the inputted output value (the output value inputted from the operating apparatus 10 is hereinafter referred to as the "input value").

In the example depicted in (a) of FIG. 10, a pair of markers are coupled linearly (i.e., by the shortest path) to each other with a coupling element (formed by clay or an array of building blocks) having a predetermined width (hereinafter referred to as the reference width).

In this case, the control apparatus 30 outputs, to the information processing apparatus 20, on an as-is basis, the operation-related information inputted from the operating apparatus 10 based, for example, on the operation of an analog switch related to the markers. In this case, therefore, the input value is equal to an output value outputted from the control apparatus 30 (an output value received by the information processing apparatus 20) ((a) of FIG. 11).

Further, in the example depicted in (b) of FIG. 10, a pair of markers are coupled linearly (i.e., by the shortest path) to each other with a coupling element (formed by clay or an array of building blocks) having a predetermined width, as is the case with (a) of FIG. 10. However, the width depicted in (b) of FIG. 10 is two times the reference width.

Figure 11:
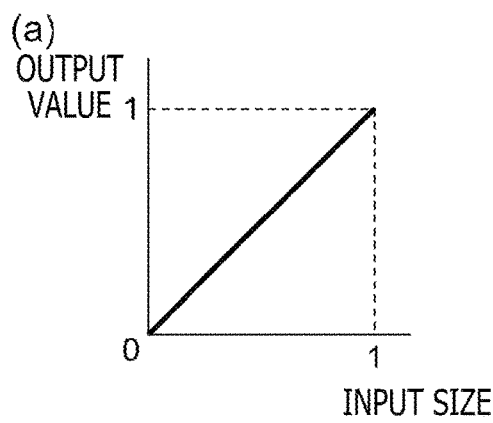
FIG. 11 depicts diagrams illustrating examples of processing performed based on the connection between the markers on the board used by the control apparatus according to the embodiment of the present invention.
Figure 11:
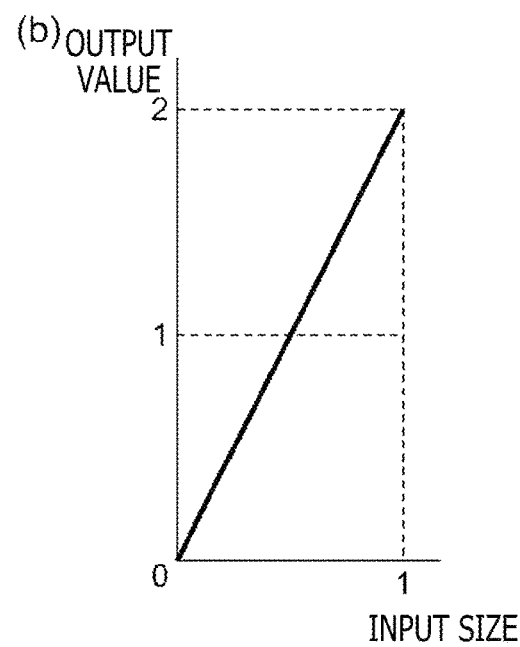
Figure 11:
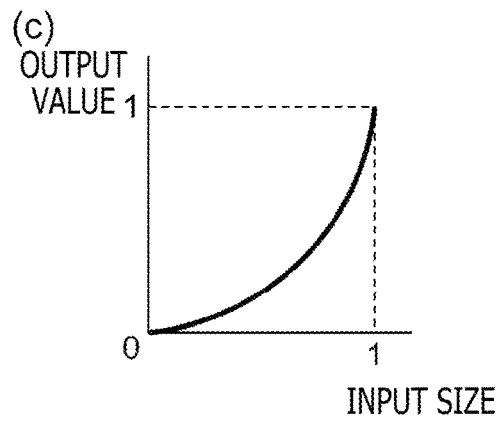
Figure 11:
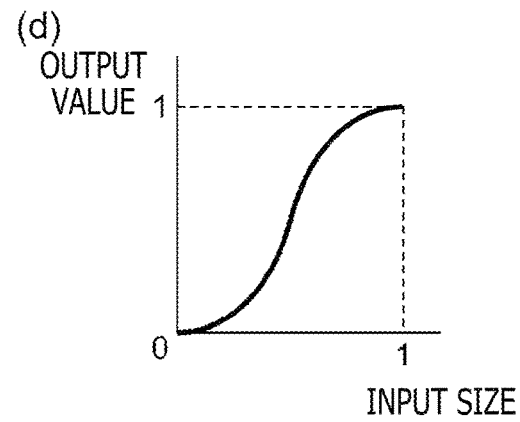
Figure 11:
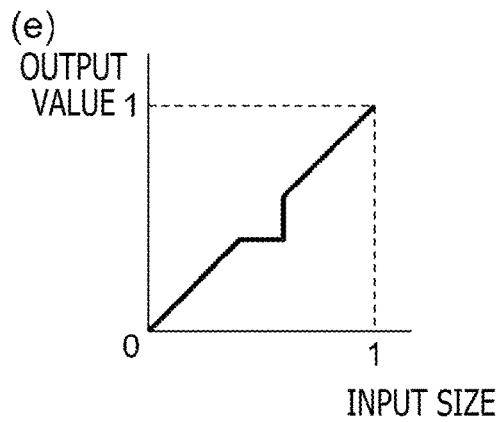
Figure 11:
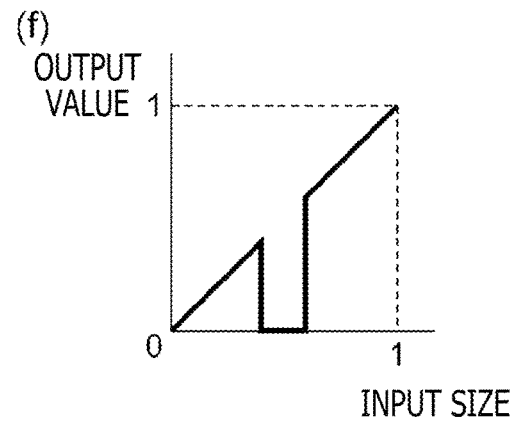

In this case, the control apparatus 30 doubles the operation-related information regarding the input value that is inputted from the operating apparatus 10 based, for example, on the operation of an analog switch related to the markers (multiplies the operation-related information regarding the input value by the ratio of the width to the reference width), and then outputs the obtained information to the information processing apparatus 20. In this case, therefore, the input value is proportional to the output value outputted from the control apparatus 30 (the output value received by the information processing apparatus 20). However, the coefficient of proportionality is not 1:1 but is 1:2 ((b) of FIG. 11). It should be noted that the output value indicated in (b) of FIG. 11 is "510," which is two times the original output value "255" of the analog switch. However, if the output value to be outputted to the information processing apparatus 20 is above the upper limit set for the output value, the upper-limit value may be outputted to the information processing apparatus 20 instead of the output value.

Further, the width of the coupling element may be tapered instead of being fixed. In the example depicted in (c) of FIG. 10, the coupling element is disposed between a pair of markers in such a manner that the width of the coupling element monotonically increases at a fixed rate in one direction (in a rightward direction in the example depicted in (c) of FIG. 10). In this example, the control apparatus 30 may perform transformation such that the operation-related information regarding the input value inputted from the operating apparatus 10 based on the operation of an analog switch related to the markers is transformed into a value that nonlinearly (e.g., exponentially) increases in accordance with the input value, and output the result of transformation ((c) of FIG. 11).

It should be noted that the orientation of the curve of the above transformation may vary with the direction of tapering (depending on which of the left and right sides has a smaller width). For example, in a case where the left side is formed to have a smaller width, the control apparatus 30 may logarithmically increase, based on the input value, the output value to be outputted to the information processing apparatus 20 instead of exponentially increasing the output value.

Further, in the example depicted in (d) of FIG. 10, the width of a central portion is increased. In this case, as illustrated in (d) of FIG. 11, the control apparatus 30 may use an S-shaped function to transform, based on the input value, the output value to be outputted to the information processing apparatus 20, and output the output value obtained by transformation to the information processing apparatus 20.

Furthermore, in the example depicted in (e) of FIG. 10, a pair of markers are coupled with clay that is shaped like a rectangular parallelepiped and twisted once in the middle. In this example, the control apparatus 30 may recognize that the coupling element is twisted, and transform the input value with a function for causing a step-like change in the middle as illustrated, for example, in (e) of FIG. 11 in order to obtain the output value to be outputted to the information processing apparatus 20.

In the example depicted in (f) of FIG. 10, a pair of markers are coupled to each other with a row of blocks such as building blocks, as is the case with (a) of FIG. 10, and a differently shaped block is disposed on a part of the row of blocks. In this case, for example, the control apparatus 30 may recognize the position of the differently shaped block (the position between the pair of markers) placed in touch with the coupling element, obtain a newly shaped function by substituting a predetermined function for only an input value range of a direct proportional function illustrated in (a) of FIG. 11 that corresponds to the recognized position, and transform the output value by using the obtained newly shaped function ((f) of FIG. 11). For instance, in the example depicted in (f) of FIG. 11, the input value range of the direct proportional function that corresponds to the position of the differently shaped block is substituted by a function whose output value is fixed to "0." It should be noted that the correspondence between block position and input value range may be defined as described below. Namely, in a case where the differently shaped block is disposed in touch with a portion over a distance of 10 to 11 from the marker on one side while the distance between the marker on the one side and the marker on the other side is L, the control apparatus 30 should assume that the minimum input value is "0" while the maximum input value is Vmax, and substitute a predetermined function for an input value range between Vmax/L×10 and Vmax/L×11.

In the example depicted in (g) of FIG. 10, clay is used to perform the same setup as indicated in (f) of FIG. 10. In this example, a hole H is formed in a part of a coupling section formed by clay instead of coupling a differently shaped lump of clay. In this case, too, when the hole H is formed over a distance of 10 to 11 from the marker on one side, the control apparatus 30 assumes that the minimum input value is "0" while the maximum input value is Vmax, substitutes a predetermined function for an input value range between Vmax/L×10 and Vmax/L×11, uses the predetermined function to transform the input value to an output value, and outputs the output value to the information processing apparatus 20.

Further, in addition to performing an input value transformation process, the control apparatus 30 may incorporate information regarding a coupling element path length into the operation-related information and output the resulting operation-related information to the information processing apparatus 20. In the example depicted in (h) of FIG. 10, a pair of markers are coupled to each other through a meandering path formed by clay. The control apparatus 30 extracts a clay portion from image data obtained by capturing an image, performs a thinning process on the clay portion to determine the length of a line segment, divides the determined length by the distance between the coupled markers to obtain information regarding a path length, incorporates the information regarding the path length into the operation-related information, and outputs the resulting operation-related information.

When, for example, using the information regarding the path length in order to delay the time point at which processing starts subsequently to an operation (in order to set the latency), the information processing apparatus 20 should proceed to perform processing after performing setup such that the amount of delay increases with an increase in the path length described in the information.

Alternative Examples of Coupling Element Detection

It should be noted that the foregoing description assumes that the control apparatus 30 captures an image of a target object to obtain image data, and performs a process based on the obtained image data in order, for example, to acquire information indicating an inter-marker coupling state. However, the present embodiment is not limited to such processing.

Alternatively, in a situation where information regarding the inter-marker coupling state can be acquired, the control apparatus 30 may use, for example, electrically conductive clay as the clay acting as a coupling element, acquire information regarding various physical properties, such as resistance and magnetic permeability between a pair of markers, and obtain information indicating the state of coupling between individual markers.

Further, when using a resistance value, the control apparatus 30 may incorporate information regarding the resistance value into the operation-related information and output the resulting operation-related information because the resistance value is affected, for example, by path length and coupling element width. In this case, the information processing apparatus 20 may determine the amount of delay (the magnitude of latency) between an operation and the start of corresponding processing by using the information regarding the resistance value, which is included in the operation-related information.

According to the above example, the control apparatus 30 is able to process the operation-related information by using physical property values that are indistinguishable by appearance. Therefore, even when, for example, a block disposed on the board 51 is visible to an opponent, the opponent will not understand a strategy set by that block.

Moreover, the processing to be performed on the operation-related information by the control apparatus 30 can be changed by changing the internal configuration (indistinguishable by appearance) of coupling elements formed by blocks or clay. More specifically, the processing to be performed on the operation-related information by the control apparatus 30 can be changed, for example, by hollowing out the inside of clay.

Game Examples

When, as described above, the mode of operation is made changeable by using, for example, clay for coupling purposes in a situation where, for instance, a team including a plurality of players plays a game to compete against another team, the following game can be offered by distributing a fixed amount of clay to each team, allowing the players of each team to share the distributed clay in accordance with the strategy of each team, and permitting the players to use the clay for coupling between markers.

The following description assumes that the information processing apparatus 20 performs processing in such a manner as to allow the width of clay used for coupling corresponding markers to affect parameters representing attack power and attack avoidance quickness in a game where instructions for attacking with different weapons are assigned to the buttons B1, B2, and B3, respectively, while an instruction for avoiding an attack is assigned to the button B4.

In this case, a certain player may use given clay to couple only a pair of markers corresponding to the buttons B1 and B2. Such use of clay causes the control apparatus 30 to block the corresponding operation-related information even when the button B3 or B4 is depressed. As a result, the control apparatus 30 does not perform processing corresponding to the buttons B3 and B4. Instead, the control apparatus 30 performs setup so as to increase the attack power related to the buttons B1 and B2.

Further, when the clay distributed to a team is wholly used to couple markers on the board 51 of one player that correspond to the button B1, the attack power of the button B1 is maximized. However, the control apparatus 30 performs setup such that different types of attack cannot be made or avoided (the other players cannot make or avoid an attack).

Furthermore, in a case where a player has coupled the marker M2' to the markers M1, M2, M3, and M4, the player makes only an attack assigned to the button B2, which corresponds to the marker M2', no matter what button is depressed by the player.

Configuration

Moreover, the foregoing description assumes that the information processing apparatus 20 and the control apparatus 30 are separate from each other. Alternatively, however, these two apparatuses may be integrated into a single unit.

REFERENCE SIGNS LIST

10: Operating apparatus
11: Main body section
12: Grip section
13: Button operating section
14: Analog stick
20: Information processing apparatus
21: Control section
22: Storage section
23: Operation control section
24: Display control section
25: Communication section
30: Control apparatus
31: Imaging section
32: Control section
33: Storage section
34: Input section
35: Output section
41: Reception section
42: Setting acquisition section
43: Processing section
44: Output processing section
51: Board

The invention claimed is:

1. A control apparatus that is connected to an operating apparatus and to an information processing apparatus, the operating apparatus receiving an operation performed by a user, the information processing apparatus performing information processing based on the operation performed by the user at the operating apparatus, the control apparatus comprising:
processing circuitry configured to augment the information processing corresponding to the operation performed by the user at the operating apparatus using a target object, the augmenting including:
receiving operation-related information indicating the operation performed by the user at the operating apparatus;
acquiring, from the target object, setting information regarding an operation content receivable by the operating apparatus;
processing the received operation-related information according to the acquired setting information; and
outputting the processed operation-related information processed according to the acquired setting information to the information processing apparatus,
wherein the control apparatus causes the information processing apparatus to perform the information processing based on the processed operation-related information processed according to the acquired setting information.

2. The control apparatus according to claim 1, wherein
the target object includes a computer-recognizable pattern that corresponds to an operation target included in the operating apparatus,
the operation-related information indicates a user operation performed on the operation target corresponding to the pattern, and
the processing circuitry is configured to:
recognize, based on image information obtained by imaging the target object, a user operation content on the target object,
determine the recognized user operation content as the setting information, and
process the operation-related information indicating the user operation performed on the operation target based on the setting information.

3. The control apparatus according to claim 2, wherein
the target object is a sheet-shaped target,
the user operation content includes a fold of the target object, and
the setting information includes disposition information regarding the pattern and a side or a vertex of the target object and is obtained as a result of the user operation content being recognized based on the image information.

4. The control apparatus according to claim 2, wherein
the target object includes a plurality of computer-recognizable patterns that are disposed in correspondence with individual operation targets included in the operating apparatus,
the setting information includes information that indicates a mode of formation of one or more coupling element for each of the operation targets, the one or more coupling element being disposed between multiple of the patterns, disposed on the target object as a result of the user operation content on the target object, and recognized based on the image information,
the user operation includes a user operation performed on a corresponding one of the operation targets, and
the processing circuitry is configured to process the operation-related information based on a corresponding mode of formation included in the setting information.

5. The control apparatus according to claim 2, wherein the one or more coupling element includes a plastic material or a plurality of block members.

6. The control apparatus according to claim 2, wherein
the operation target includes a switch whose output is gradual between a lower boundary and an upper boundary,
the operation-related information indicates the user operation performed with respect to the switch,
the user operation content on the target object includes a manipulation of the target object,
the manipulation of the target objection is recognized as the setting information, and
the processing circuitry is configured to process the operation-related information so as to discretize the output of the switch into the lower boundary or the upper boundary based upon the setting information.

7. The control apparatus according to claim 6, wherein
the switch is an analog switch,
the lower boundary is a value of 0, and
the upper boundary is a value of 255.

8. A control method used by a control apparatus that is connected to an operating apparatus and to an information processing apparatus, the operating apparatus receiving an operation performed by a user, and the information processing apparatus performing information processing based on the operation performed by the user at the operating apparatus, the control method comprising:
  augmenting the information processing corresponding to the operation performed by the user at the operating apparatus using a target object, the augmenting including:
    receiving operation-related information indicating the operation performed by the user at the operating apparatus;
    acquiring, from the target object, setting information regarding an operation content receivable by the operating apparatus;
    processing the received operation-related information according to the acquired setting information; and
    outputting the processed operation-related information processed according to the acquired setting information to the information processing apparatus;
  wherein the control method causes the information processing apparatus to perform the information processing based on the processed operation-related information processed according to the acquired setting information.

9. A non-transitory computer readable medium storing a program for a control apparatus that is connected to an operating apparatus and to an information processing apparatus, the operating apparatus receiving an operation performed by a user, the information processing apparatus performing information processing based on the operation performed by the user at the operating apparatus, and the program including instructions which when executed cause the control apparatus to perform a method, the method comprising:
  augmenting the information processing corresponding to the operation performed by the user at the operating apparatus using a target object, the augmenting including:
    receiving operation-related information indicating the operation performed by the user at the operating apparatus;
    acquiring, from the target object, setting information regarding an operation content receivable by the operating apparatus;
    processing the received operation-related information according to the acquired setting information; and
    outputting the processed operation-related information processed according to the acquired setting information to the information processing apparatus,
  wherein the method causes the information processing apparatus to perform the information processing based on the processed operation-related information processed according to the acquired setting information.

* * * * *